US008874405B2

(12) United States Patent
Sun et al.

(10) Patent No.: US 8,874,405 B2
(45) Date of Patent: Oct. 28, 2014

(54) SHOCK ABSORPTION PLATFORM

(75) Inventors: Xiaoliang Sun, Changsha Hunan (CN);
Weiwei Kong, Shaanxi (CN)

(73) Assignee: Empire Technology Development LLC, Wilmington, DE (US)

( * ) Notice: Subject to any disclaimer, the term of this patent is extended or adjusted under 35 U.S.C. 154(b) by 774 days.

(21) Appl. No.: 12/943,219

(22) Filed: Nov. 10, 2010

(65) Prior Publication Data
US 2012/0111110 A1     May 10, 2012

(51) Int. Cl.
*G01P 15/00*     (2006.01)
*F16F 15/00*     (2006.01)

(52) U.S. Cl.
CPC ..................... *F16F 15/00* (2013.01)
USPC ............................ 702/141; 73/488

(58) Field of Classification Search
USPC .............. 702/141, 153; 700/245, 302; 73/488
See application file for complete search history.

(56) References Cited

U.S. PATENT DOCUMENTS 5,638,303 A * 6/1997 Edberg et al. ................. 700/302
2011/0313568 A1 * 12/2011 Blackwell et al. ............ 700/245

* cited by examiner

*Primary Examiner* — Jonathan C Teixeira Moffat
*Assistant Examiner* — Hien Vo
(74) *Attorney, Agent, or Firm* — Ren-Sheng International

(57) ABSTRACT

Technologies are generally described for effectively damping the vibration of a platform. In some examples, a platform system for minimizing shock to an object includes a base, a platform effective to carry the object, a number of actuators coupled between the platform and the base and being configured to adjust an orientation of the platform based on control signals, a number of accelerometers positioned on the base, and a processor coupled to the accelerometers and the actuators. The processor is programmed to collect acceleration data from the accelerometers, determine an acceleration vector of the platform from the acceleration data, compensate for the acceleration vector by determining travels and travel directions for the actuators in an effort to maintain contact between the platform and the object, and generate control signals to actuate the actuators with the travels in the travel directions.

16 Claims, 5 Drawing Sheets (400) A computer product (402) Signal bearing medium (404) at least one of one or more instructions for minimizing shock to an object on a platform above a base, comprising:

collecting acceleration data from a number of accelerometers on the base;

determining, by a processor, an acceleration vector of the platform from the acceleration data;

compensating, by the processor, for the acceleration vector by determining travels and travel directions for a number of actuators coupled between the platform and the base in an effort to maintain contact between the platform and the object; and/or actuating the actuators with the travels in the travel directions.

| (406) A non-transitory computer-readable medium | (408) A recordable medium | (410) A communications medium |

FIG. 4

SHOCK ABSORPTION PLATFORM

BACKGROUND

During transportation, an object carried by a vehicle may be subjected to motions from poor driving and/or road conditions. When a motion is severe enough, the object may separate from its supporting surface. For example, a large bump in the road may send an unsecured package airborne from the bed of a truck. Damage ensues when the object falls back down against the vehicle. While the object may be secured to its supporting surface, the object would still experience all the motions of the vehicle. Thus, a shock absorption platform is desired to insulate the object from the motions of the vehicle.

SUMMARY

In one or more embodiments of the present disclosure, a platform system for minimizing shock to an object includes a base, a platform effective to carry the object, a number of actuators coupled between the platform and the base and being configured to adjust an orientation of the platform based on control signals, a number of accelerometers positioned on the base and being configured to generate acceleration data, and a processor coupled to the accelerometers and the actuators. The processor is programmed to collect acceleration data from the accelerometers, determine an acceleration vector of the platform from the acceleration data, compensate for the acceleration vector by determining travels and travel directions for the actuators in an effort to maintain contact between the platform and the object, and generate control signals to actuate the actuators with the travels in the travel directions.

In one or more embodiments of the present disclosure, a method for minimizing shock to an object on a platform above a base includes collecting acceleration data from a number of accelerometers on the base, determining, by a processor, an acceleration vector of the platform from the acceleration data; compensating, by the processor, for the acceleration vector by determining travels and travel directions for a number of actuators coupled between the platform and the base in an effort to maintain contact between the platform and the object, and actuating the actuators with the travels in the travel directions.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 4 shows an illustrative embodiment of an example computer program product arranged in accordance with at least some embodiments of the present disclosure.

DETAILED DESCRIPTION

Figure 1:
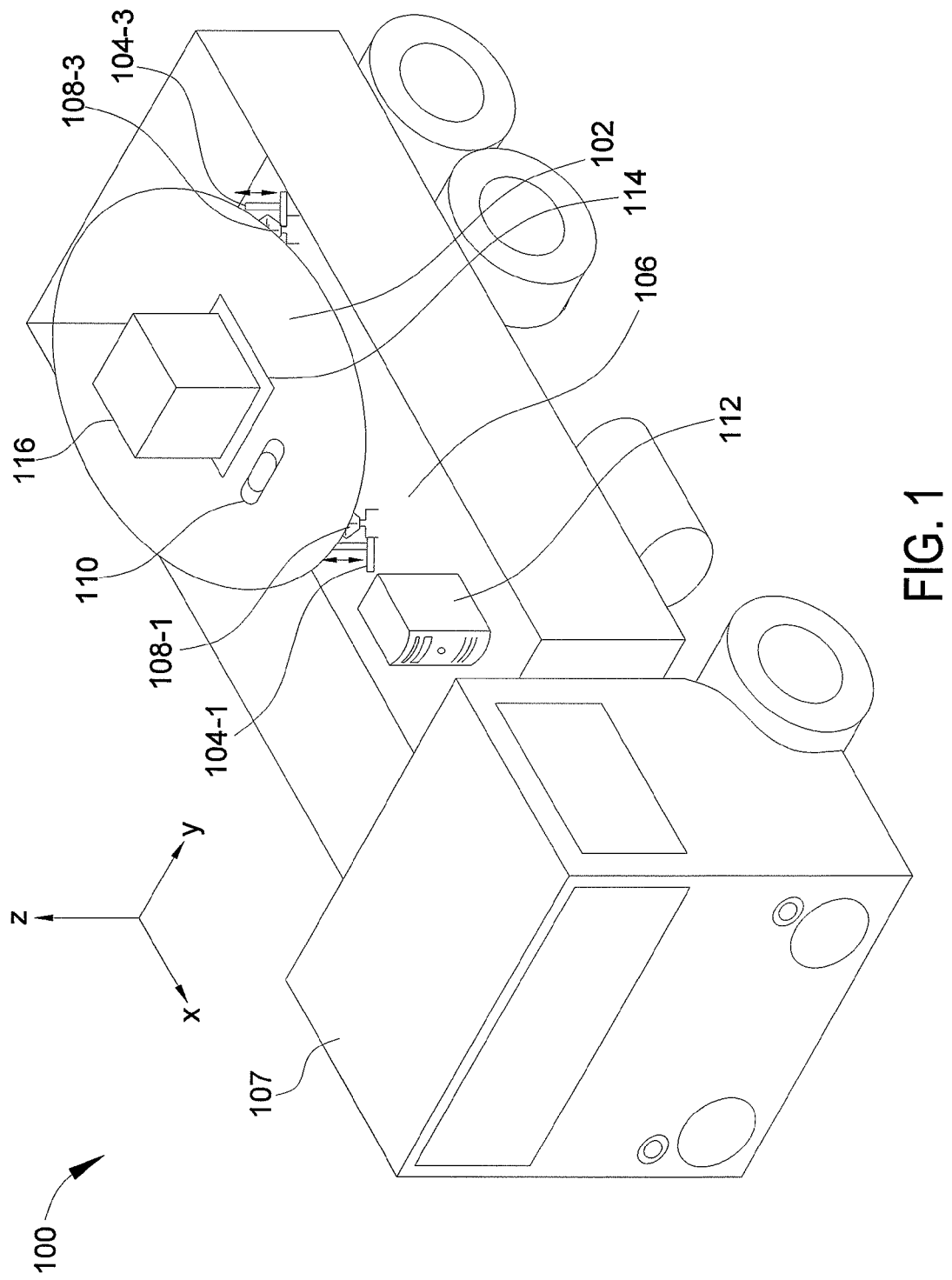
FIG. 1 shows a perspective view of an illustrative embodiment of a shock absorption system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

This disclosure is drawn, inter alia, to methods, apparatus, computer programs, and systems related to a shock absorption system. An object may be placed on a platform of the system for transportation. During transportation, the object may be subject to external forces that could cause the object to vertically separate from the platform. In order to keep the object in contact with the platform, the shock absorption system includes accelerometers and actuators supporting the platform. The accelerometers collect acceleration data, which is used to control the actuators to orient the platform so that the object may remain in contact with the platform.

Figure 2:
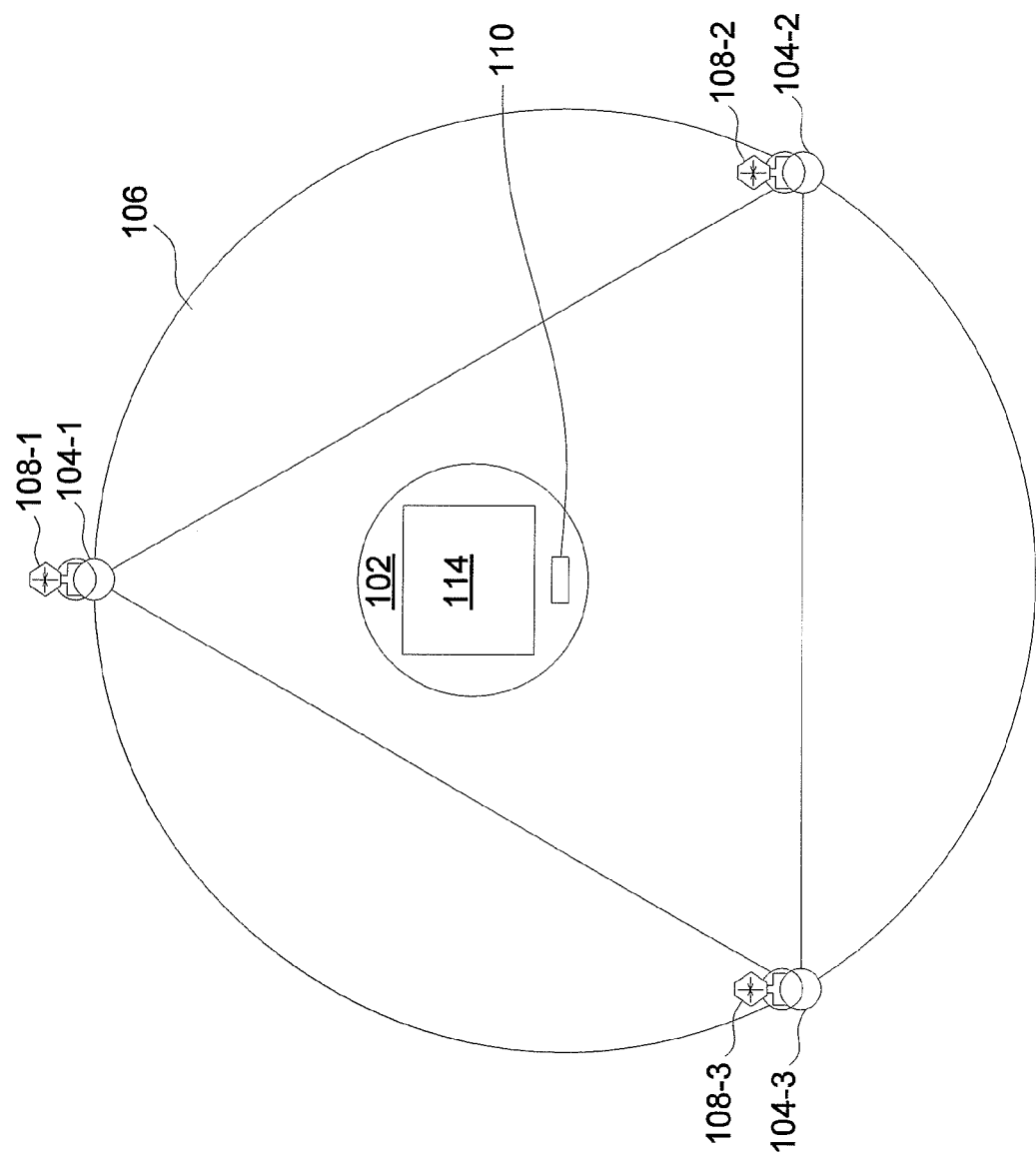
FIG. 2 shows a top view of an illustrative embodiment of the shock absorption system of FIG. 1.

FIGS. 1 and 2 show perspective and top views of an illustrative embodiment of a shock absorption system 100. System 100 includes a platform 102, three or more actuators, such as actuators 104-1, 104-2, and 104-3, a base 106, one or more accelerometers, such as accelerometers 108-1, 108-2, and 108-3, an optional level sensor 110, and a controller 112. In some embodiments, the number of accelerometers may be different than the number of actuators.

Platform 102 is supported by actuators 104-1, 104-2, and 104-3 above base 106, which is mounted on any vehicle 107. In one or more embodiments, accelerometers 108-1, 108-2, and 108-3 are fixed on base 106. Alternatively, one or more accelerometers may be fixed on platform 102, object 116, or another location as long as the accelerometers are able to provide acceleration data for determining an accelerator vector of platform 102.

In one or more embodiments, level sensor 110 is fixed on platform 102. Controller 112 is coupled to receive acceleration data from accelerometers 108-1, 108-2, and 108-3, level data from level sensor 110, and to provide control signals to actuators 104-1, 104-2, and 104-3. Platform 102 includes an optional recess 114 for receiving an object 116.

In one or more embodiments, accelerometers 108-1, 108-2, and 108-3 are arranged so they form vertices of a triangular located within base 106. Base 106 may be part of system 100 or it may be part of vehicle 107. Accelerometers 108-1, 108-2, and 108-3 may be three-axis accelerometers. The accelerometer axes may be aligned, with the z axes normal to base 106. Accelerometers 108-1, 108-2, and 108-3 may be microelectromechanical systems (MEMS) accelerometers from MEMSIC of Andover, Mass.

In one or more embodiments, actuators 104-1, 104-2, and 104-3 are coupled to base 106 and coincident with accelerometers 108-1, 108-2, and 108-3, respectively. As noted above, in other embodiments, the actuators and the accelerometers may be not coincident in terms of number and/or position. The lower ends of actuators 104-1, 104-2, and 104-3 may be fixed to base 106. The upper ends of actuators 104-1, 104-2, and 104-3 may be coupled by rotatable joints to platform 102. The rotatable joints may provide three degrees of rotational freedom. Actuators 104-1, 104-2, and 104-3 may be linear actuators using stepper motors for precise control. The travel axes of actuators 104-1, 104-2, and 104-3 may be aligned with the z axes of the corresponding accelerometers 108-1, 108-2, and 108-3. Actuators 104-1, 104-2, and 104-3 may roll platform 102 about the x axis, pitch the platform about the y axis, and vertically translate the platform along the z axis. To roll platform 102 about the x axis, actuators 104-2 and 104-3 may move in opposite directions while actuator 104-1 may remain stationary. To pitch platform 102 about the y axis, actuator 104-1 may translate while actuators 104-2 and 104-3 remain stationary. To vertically translate platform 102, actuators 104-1, 104-2, and 104-3 may translate in unison.

In one or more embodiments, recess 114 has a similar shape and dimension as object 116 to prevent lateral movements of the object. Alternatively recess 114 may be lined with high friction material to prevent lateral movement of object 116. Object 116 may also be tied down to platform 102, in which case recess 114 may be absent.

In one or more embodiments, level sensor 110 detects if platform 102 is level along the x and the y axes. Level data provided by level sensor 110 may be used to initially place or return platform 102 to a level orientation to prevent object 116 from sliding about the platform. Level sensor 100 is an optional component since platform 102 may not need to be absolutely level as long as object 116 remains stationary relative to the platform.

In one or more embodiments, controller 112 includes a memory and a processor executing software instructions in the memory. Controller 112 generates the control signals to actuators 104-1, 104-2, and 104-3 in response to the acceleration data from accelerometers 108-1, 108-2, and 108-3, and optionally in response to level data from level sensor 110. Controller 112 adjusts the orientation of platform 102 in an attempt to maintain contact between object 116 and platform 102.

In a simplified example, when vehicle 107 hits a bump, platform 102 experiences an external force causing an upward acceleration. In response, controller 112 causes actuators 104-1, 104-2, and 104-3 to retract so object 116 remains relatively stationary and does not experience the upward acceleration that may otherwise damage the object. After vehicle 107 passes over the bump, gravity causes a downward acceleration. In response, controller 112 causes actuators 104-1, 104-2, and 104-3 to extend so object 116 remains relatively stationary and does not experience the downward acceleration against platform 102 that may otherwise damage the object.

Figure 3:
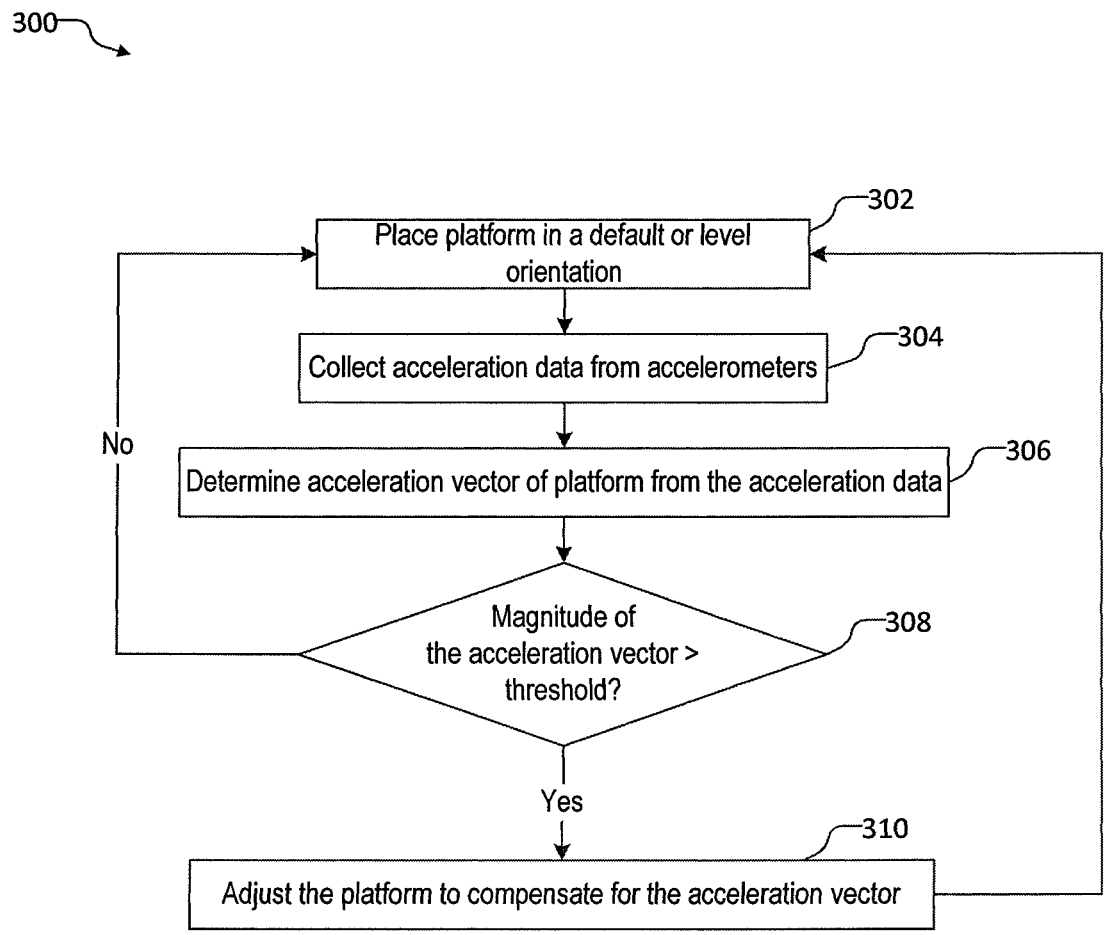
FIG. 3 shows a flow diagram of an illustrative embodiment of a method for leveling a platform controlled by the shock absorption system of FIG. 1.

FIG. 3 shows a flow diagram of an illustrative embodiment of a method 300 for leveling a platform controlled by shock absorption system 100 of FIG. 1. Method 300 may include one or more operations, functions or actions as illustrated by one or more of blocks 302, 304, 306, 308, and 310. Although illustrated as discrete blocks, various blocks may be divided into additional blocks, combined into fewer blocks, or eliminated, depending on the desired implementation.

Method 300 may begin at block 302, "Place platform in a default or level orientation." Block 302 may be followed by block 304, "Collect acceleration data from accelerometers." Block 304 may be followed by block 306, "Determine acceleration vector of platform from the acceleration data." Block 306 may be followed by optional decision block 308, "Magnitude of the acceleration vector > than a threshold?" If the determination at optional decision block 308 is "Yes", block 308 may be followed by block 310, "Adjust the platform to compensate for the acceleration vector." If the determination at optional decision block 308 is "No", block 308 may be followed by optional block 302.

At block 302, controller 112 may provide the control signals to initially place platform 102 in a default orientation. The control signals may place actuators 104-1, 104-2, and 104-3 at about the middle of their total travel so they have sufficient travel in either direction. Optionally based on the level data indicating the roll and the pitch of platform 102 about x and y axes, respectively, controller 112 may further provide the control signals to place platform 102 in a level orientation. This later adjustment is optional as level sensor 110 is an optional component.

At block 304, controller 112 collects the acceleration data from accelerometers 108-1, 108-2, and 108-3.

At block 306, controller 112 determines the acceleration vector of platform 102 from the acceleration data. In one or more embodiments, controller 112 determines the acceleration vector using the following formulas.

$$a = (a_{108-1}, a_{108-2}, a_{108-3})$$

$$\begin{cases} a_{108-1} = (a_{108-1x}, a_{108-1y}, a_{108-1z}) \\ a_{108-2} = (a_{108-2x}, a_{108-2y}, a_{108-2z}) \\ a_{108-3} = (a_{108-3x}, a_{108-3y}, a_{108-3z}) \end{cases}$$

In the above formulas, a is the acceleration vector of platform 102, and $a_{108-1}$, $a_{108-2}$, and $a_{108-3}$ are the acceleration vectors of accelerometers 108-1, 108-2, 108-3. As noted above, the acceleration vector of platform 102 may be determined from one or more accelerometers placed at different locations. For example, a single accelerometer may be fixed to platform 102 near object 116 (e.g., on the platform center) or on the object.

At optional decision block 308, controller 112 determines whether the magnitude of the acceleration vector is larger than a threshold. Optional decision block 308 allows controller 112 to ignore small, insignificant shocks that would not damage object 116. The threshold may be set according to the type of object 116 being transported. When the magnitude of the acceleration vector is larger than the threshold, optional decision block 308 may be followed by block 310. Otherwise optional decision block 308 may loop back to block 302 where controller 112 continues to level platform 102.

As an alternative to optional decision block 308, block 306 may be followed by block 310 so controller 112 adjusts platform 102 in response to all detectable accelerations.

At block 310, controller 112 determines travels and travel directions for actuators 108-1, 108-2, and 108-3 to compensate the acceleration vector in an attempt to maintain contact between object 116 and platform 102. The acceleration vector may indicate that platform 102 is being translated along the z axis as well as being rolled and/or pitches about the x axis and/or the y axis. To compensate for such acceleration vector, platform 102 may need to be translated, rolled, and/or pitched in the opposite directions. In one or more embodiments, controller 112 determines the travels and the travel directions experienced by base 106 at the locations of accelerometers 108-1, 108-2, and 108-3 using the following formulas.

$$\begin{cases} s_{108-1} = \int\int a_{108-1} \\ s_{108-2} = \int\int a_{108-2} \\ s_{108-3} = \int\int a_{108-3} \end{cases}$$

Travels $s_{108-1}$, $s_{108-2}$, and $s_{108-3}$ may be positive or negative to indicate the travel directions at the locations of accelerometers 108-1, 108-2, and 108-3. Using travels $s_{108-1}$, $s_{108-2}$, and $s_{108-3}$, an angle θ between base 106 and the horizontal plane may be determined. Based on travels $s_{108-1}$, $s_{108-2}$, and $s_{108-3}$ and angle θ, travels $s_{104-1}$, $s_{104-2}$, and $s_{104-3}$ of actuators 104-1, 104-2, and 104-3 may be determined.

When a single accelerometer is fixed to platform 102 near object 116 or on the object, the travel and the travel direction experienced by the platform or the object may be determined from the acceleration vector of the accelerometer. Using the travel, an angle θ between platform 102 or object 116 and the horizontal plane may be determined. Based on the travel and angle θ, travels $s_{104-1}$, $s_{104-2}$, and $s_{104-3}$ of actuators 104-1, 104-2, and 104-3 may be determined.

Controller 112 then provides the control signals to adjust actuators 104-1, 104-2, and 104-3 to compensate for the acceleration vector. Block 310 may be followed by block 302, where controller 112 returns platform 102 to a default or a level orientation.

FIG. 4 is a block diagram of an illustrative embodiment of a computer program product 400 for implementing a method for transporting an object on a platform. Computer program product 400 may include a signal bearing medium 402. Signal bearing medium 402 may include one or more sets of executable instructions 404 that, when executed by, for example, a processor, may provide the functionality described above. Thus, for example, referring to shock absorption system 100 of FIG. 1, processor 170 may undertake one or more of the operations shown in at FIG. 3 in response to instructions 404 conveyed by signal bearing medium 402.

In some implementations, signal bearing medium 402 may encompass a non-transitory computer readable medium 406, such as, but not limited to, a hard disk drive, a Compact Disc (CD), a Digital Video Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communications link, a wireless communication link, etc.). Thus, for example, computer program product 400 may be wirelessly conveyed to shock absorption system 100 by signal bearing medium 402, where signal bearing medium 402 is conveyed by a wireless communications medium 410 (e.g., a wireless communications medium conforming with the IEEE 802.11 standard). Computer program product 400 may be recorded on non-transitory computer readable medium 406 or another similar recordable medium 408.

Figure 5:
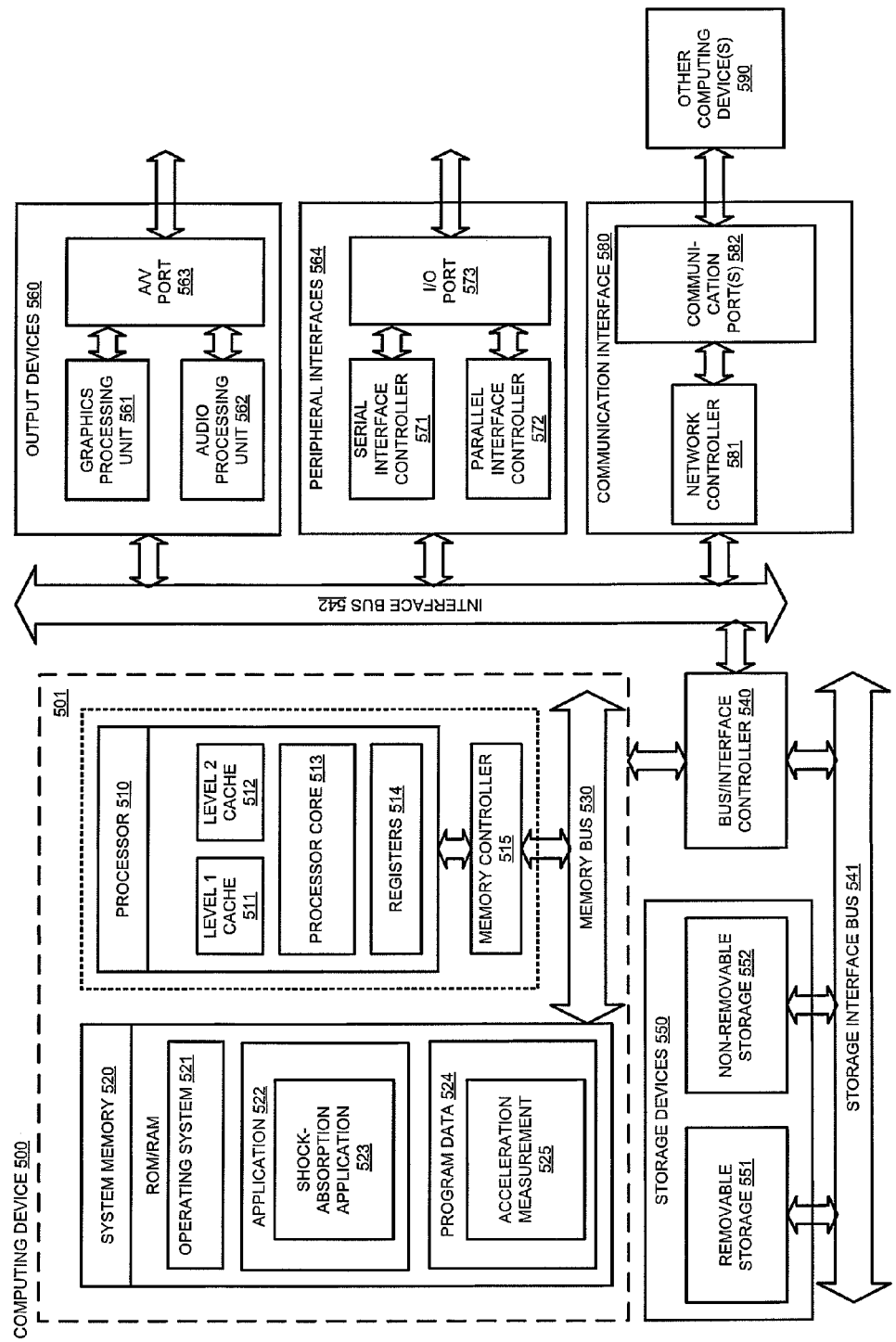
FIG. 5 shows a block diagram of an illustrative embodiment of an example computing device that can be arranged in accordance with at least some embodiments of the present disclosure.

FIG. 5 shows a block diagram of an illustrative embodiment of an example computing device 500 that can be arranged to work in a platform system in accordance with the present disclosure. In a very basic configuration 501, computing device 500 may include one or more processors 510 and a system memory 520. A memory bus 530 may be used for communicating between the processor 510 and the system memory 520.

Depending on the desired configuration, processor 510 may be of any type including but not limited to a microprocessor (μP), a microcontroller (μC), a digital signal processor (DSP), or any combination thereof. Processor 510 can include one or more levels of caching, such as a level one cache 511 and a level two cache 512, a processor core 513, and registers 514. The processor core 513 can include an arithmetic logic unit (ALU), a floating point unit (FPU), a digital signal processing core (DSP Core), or any combination thereof. A memory controller 515 can also be used with the processor 510, or in some implementations the memory controller 515 can be an internal part of the processor 510.

Depending on the desired configuration, the system memory 520 may be of any type including but not limited to volatile memory (such as RAM), non-volatile memory (such as ROM, flash memory) or any combination thereof. System memory 520 may include an operating system 521, one or more applications 522, and program data 524. Application 522 may include a shock-absorption application 523 that is arranged to perform the functions and/or operations as described herein including at least the functional blocks and/or operations described with respect to process 300 of FIG. 3. Program Data 524 may include acceleration data and/or geometric data. In some example embodiments, application 522 may be arranged to operate with program data 524 on an operating system 521 such that implementations of shock absorption processes may be provided as described herein. This described basic configuration is illustrated in FIG. 5 by those components within dashed line 501.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of device 500.

Computing device 500 may also include an interface bus 542 for facilitating communication from various interface devices (e.g., output interfaces, peripheral interfaces, and communication interfaces) to the basic configuration 501 via the bus/interface controller 540. Example output interfaces 560 may include a graphics processing unit 561 and an audio processing unit 562, which may be configured to communicate to various external devices such as a display or speakers via one or more NV ports 563. Example peripheral interfaces 560 may include a serial interface controller 571 or a parallel interface controller 572, which may be configured to communicate with external devices such as input devices (e.g., keyboard, mouse, pen, voice input device, touch input device) or other peripheral devices (e.g., printer, scanner) via one or more I/O ports 573. An example communication interface 580 includes a network controller 581, which may be arranged to facilitate communications with one or more other computing devices 590 over a network communication link via one or more communication ports 582.

The network communication link may be one example of a communication media. Communication media may typically be embodied by computer readable instructions, data structures, program modules, or other transport mechanism, and may include any information delivery media. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 500 may also be implemented as a personal computer including both laptop computer and non-laptop computer configurations. In addition, computing device 500 may be implemented as part of a wireless base station or other wireless system or device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory; and a transmission type medium such as a digital and/or an analog communication medium (e.g., a fiber optic cable, a waveguide, a wired communications link, a wireless communication link).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to"). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim 1ncludes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A platform system for minimizing shock to an object, comprising:
    a base;
    a platform effective to carry the object;
    a plurality of actuators coupled between the platform and the base, the actuators configured to adjust an orientation of the platform based on control signals;
    one or more accelerometers configured to generate acceleration data;
    a level sensor on the platform; and
    a processor coupled to the accelerometers, the actuators, and the level sensor, wherein the processor being programmed to:
        collect the acceleration data from the accelerometers and level data from the level sensor;
        determine an acceleration vector of the platform from the acceleration data;
        compensate for the acceleration vector by determining travels and travel directions for the actuators;
        generate a first set of control signals to actuate the actuators with the travels in the travel directions; and
        generate a second set of control signals based on the level data to actuate the actuators to level the platform after generating the first set of control signals.

2. The system of claim 1, wherein the actuators are coincident with respective accelerometers on the base.

3. The system of claim 2, wherein the accelerometers define vertices of a triangle located within the base.

4. The system of claim 3, wherein the actuators are fixedly mounted to the base and rotatably mounted by joints to the platform at the vertices of the triangle.

5. The system of claim 4, wherein the accelerometers are three-axis accelerometers with their respective x, y, and z axes aligned and their z axes normal to the base.

6. The system of claim 5, wherein the actuators are linear actuators aligned with respective z axes of the accelerometers.

7. The system of claim 1, wherein the processor is further programmed to
    determine if a magnitude of the acceleration vector is greater than a threshold, wherein the generate the first set of control signals occurs when the magnitude of the acceleration vector is greater than the threshold.

8. The system of claim 1, wherein the base is part of a vehicle.

9. A method for minimizing shock to an object on a platform above a base, comprising:
    collecting acceleration data from a plurality of accelerometers on the base and level data from a level sensor on the platform;
    determining, by a processor, an acceleration vector of the platform from the acceleration data;
    compensating, by the processor, for the acceleration vector by determining travels and travel directions for a plurality of actuators coupled between the platform and the base in an effort to maintain contact between the platform and the object;
    actuating the actuators with the travels in the travel directions;
    determining from the level sensor on the platform if the platform is level; and again actuating the actuators based on the level data to level the platform after the actuating of the actuators with the travels in the travel directions.

10. The method of claim 9, wherein the accelerometers are coincident with respective actuators on the base.

11. The method of claim 10, wherein the accelerometers form vertices of a triangle within the base.

12. The method of claim 11, wherein the actuators are fixedly mounted to the base and rotatably mounted by joints to the platform at the vertices of the triangle.

13. The method of claim 12, wherein the accelerometers are three-axis accelerometers with their respective x, y, and z axes aligned and their z axes normal to the base.

14. The method of claim 13, wherein the actuators are linear actuators aligned with respective z axes of the accelerometers.

15. The method of claim 9, further comprising:
determining if a magnitude of the acceleration vector is greater than a threshold, wherein said actuating the actuators with the travels in the travel directions occurs when the magnitude of the acceleration vector is greater than the threshold.

16. The method of claim 9, wherein the base is part of a vehicle.

* * * * *

UNITED STATES PATENT AND TRADEMARK OFFICE
CERTIFICATE OF CORRECTION

| | | |
|---|---|---|
| PATENT NO. | : 8,874,405 B2 | Page 1 of 1 |
| APPLICATION NO. | : 12/943219 | |
| DATED | : October 28, 2014 | |
| INVENTOR(S) | : Sun et al. | |

It is certified that error appears in the above-identified patent and that said Letters Patent is hereby corrected as shown below:

In the Drawings

In Fig. 4, Sheet 4 of 5, in Box "(400)", delete "A computer product" and insert -- A computer program product --, therefor.

In Fig. 5, Sheet 5 of 5, below "PROCESSOR 510", insert -- µP/µC/DSP --.

In Fig. 5, Sheet 5 of 5, in Box "560", delete "OUTPUT DEVICES" and insert -- OUTPUT INTERFACES --, therefor.

In Fig. 5, Sheet 5 of 5, in Box "550", delete "STORAGE DEVICES" and insert -- DATA STORAGE DEVICES --, therefor.

In the Specification

In Column 3, Line 29, delete "Level sensor 100" and insert -- Level sensor 110 --, therefor.

In Column 4, Line 57, delete "actuators 108-1, 108-2, and 108-3" and insert -- actuators 104-1, 104-2, and 104-3 --, therefor.

In Column 7, Line 3, delete "NV ports" and insert -- A/V ports --, therefor.

In Column 7, Lines 3-4, delete "peripheral interfaces 560" and insert -- peripheral interfaces 564 --, therefor.

In Column 9, Line 29, delete "1ncludes" and insert -- includes --, therefor.

In the Claims

In Column 10, Line 45, in Claim 7, delete "programmed to" and insert -- programmed to: --, therefor.

Signed and Sealed this
Twenty-first Day of April, 2015

Michelle K. Lee
*Director of the United States Patent and Trademark Office*